(12) United States Patent
Kasai et al.

(10) Patent No.: US 11,943,413 B2
(45) Date of Patent: Mar. 26, 2024

(54) IMAGE READING DEVICE (71) Applicant: SEIKO EPSON CORPORATION, Tokyo (JP)

(72) Inventors: Tsuneo Kasai, Nagano (JP); Ryo Yamaguchi, Nagano (JP); Sho Arai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/149,693

(22) Filed: Jan. 4, 2023

(65) Prior Publication Data
US 2023/0216972 A1   Jul. 6, 2023

(30) Foreign Application Priority Data

Jan. 6, 2022 (JP) ................................ 2022-000998

(51) Int. Cl.
*H04N 1/193*   (2006.01)
*H04N 1/10*    (2006.01)

(52) U.S. Cl.
CPC ......... *H04N 1/1936* (2013.01); *H04N 1/1013* (2013.01); *H04N 2201/0081* (2013.01); *H04N 2201/0094* (2013.01)

(58) Field of Classification Search
CPC ........... H04N 1/02815; H04N 1/02865; H04N 23/71; H04N 1/193; H04N 1/1013; H04N 2201/0094; H04N 23/74; H04N 23/651; H04N 7/18; H04N 9/3155; H04N 1/12; H04N 2201/0434; H04N 23/555; H04N 1/00411; H04N 1/00602; H04N 1/0061; H04N 1/00811; H04N 1/00822; H04N 1/02855; H04N 1/113; H04N 1/40037; H04N 1/4005; H04N 1/506; H04N 1/508; H04N 2201/0081; H04N 2201/0418; H04N 23/56; H04N 25/447; H04N 9/3111; H04N 9/3144; H04N 9/3161; H04N 9/3164; H04N 1/00002; H04N 1/00013; H04N 1/00045; H04N 1/00082; H04N 1/00681; H04N 1/04; H04N 1/0464; H04N 1/203; H04N 1/40056; H04N 1/401; H04N 1/4076; H04N 2201/044; H04N 23/11; H04N 23/12; H04N 23/90; H04N 7/181; H04N 1/00307; H04N 1/00562; H04N 1/00567; H04N 1/047; H04N 1/195; H04N 1/19594;
(Continued)

(56) References Cited

U.S. PATENT DOCUMENTS 4,623,937 A * 11/1986 Watanabe ............ H04N 1/1017
358/484
5,923,447 A *  7/1999 Yamada .................. H04N 1/46
358/529
(Continued)

FOREIGN PATENT DOCUMENTS

JP         2016-012829 A       1/2016

*Primary Examiner* — Negussie Worku
(74) *Attorney, Agent, or Firm* — Global IP Counselors, LLP (57) ABSTRACT

A document platen on which a document is placed; and a reading sensor having a light source for irradiating the document with light, are provided, and the reading sensor performs first scanning for irradiating the document with light at a first light quantity, and then performs second scanning for irradiating the document with light at a second light quantity greater than the first light quantity.

5 Claims, 11 Drawing Sheets

(58) Field of Classification Search
CPC ... H04N 2201/0096; H04N 2201/0406; H04N 2201/0416; H04N 9/3114; H04N 9/3129; H04N 9/3158; H04N 9/3182; H04N 9/3194; H04N 9/3197; H04N 9/73; F21K 9/64; F21K 9/20; F21K 9/61; F21V 9/08; F21V 14/04; F21V 17/00; F21V 19/003; F21V 23/02; F21V 3/00; F21V 5/007; F21V 5/04; F21V 9/04; F21V 17/12; F21V 21/30; F21V 21/34; F21V 2200/20; F21V 23/0442; F21V 9/40; G03F 7/7005; G03F 7/70208; G03F 7/70283; G03F 7/70358; G03F 7/70466; G03F 7/203; G03F 7/70058; G03F 7/70141; G03F 7/70291; G03F 7/70383; G03F 7/70725; G03F 9/7011; G03F 9/7084; G03F 9/7088; G03F 7/2022; G03F 7/7055; G03F 7/70558; G03F 9/7026; H05B 45/22; H05B 45/20; H05B 47/10; H05B 47/16; H05B 47/155; H05B 45/28; H05B 35/00; H05B 45/00; H05B 45/12; H05B 45/24; H05B 45/325; H05B 47/11; H05B 47/115; H05B 47/125; H05B 47/13; H05B 47/19; H05B 45/30; H05B 45/31; H05B 45/345; H05B 45/37; H05B 45/3725; H05B 45/375; H05B 45/44; H05B 45/48; H05B 45/50; H05B 45/54; H05B 47/105

USPC .......................................................... 358/474
See application file for complete search history.

(56) References Cited

U.S. PATENT DOCUMENTS

| | | | |
|---|---|---|---|
| 6,906,833 B1* | 6/2005 | Konno ................... | H04N 1/047 358/487 |
| 7,564,599 B2* | 7/2009 | Ueno .................. | H04N 1/02835 358/475 |
| 8,059,315 B2* | 11/2011 | Endo .................. | H04N 1/02815 358/487 |
| 2002/0039207 A1* | 4/2002 | Kanda ................... | H04N 1/203 358/498 |
| 2003/0063234 A1* | 4/2003 | Oda ..................... | G02B 6/0053 349/65 |
| 2009/0290200 A1* | 11/2009 | Yoshimoto ......... | H04N 1/02865 358/475 |
| 2009/0296172 A1* | 12/2009 | Iwatsuka ................ | H04N 1/484 358/509 |
| 2012/0211664 A1* | 8/2012 | Nakajima ............. | G01J 1/4228 250/395 |
| 2015/0381837 A1 | 12/2015 | Oizumi | |
| 2018/0063358 A1* | 3/2018 | Netsu ................... | H04N 1/0405 |
| 2022/0100069 A1* | 3/2022 | Ito ...................... | G03B 21/2013 |

\* cited by examiner

IMAGE READING DEVICE

The present application is based on, and claims priority from JP Application Serial Number 2022-000998, filed Jan. 6, 2022, the disclosure of which is hereby incorporated by reference herein in its entirety.

BACKGROUND

1. Technical Field

The present disclosure relates to an image reading device.

2. Related Art

A scanner as an image reading device, particularly a so-called flatbed type scanner that reads a document while a reading sensor moves under a document platen glass is known. In the image reading device disclosed in JP-A-2016-12829, when reading a standard size document, the document size and the image are read in one scan.

However, in the case of thin documents, shadows are less likely to appear on the edge of the document, and there is a problem that the image reading device may not be able to correctly detect the size of a standard size document.

SUMMARY

According to an aspect of the present disclosure, there is provided an image reading device including: a document platen on which a document is placed; and a reading sensor having a light source for irradiating the document with light, in which the reading sensor performs first scanning for irradiating the document with light at a first light quantity, and then performs second scanning for irradiating the document with light at a second light quantity greater than the first light quantity.

DESCRIPTION OF EXEMPLARY EMBODIMENTS

Hereinafter, appropriate embodiments of the present disclosure will be described with reference to the drawings. The drawing to be used is for convenience of description. In addition, the embodiments which will be described below do not inappropriately limit the contents of the present disclosure described in the claims. Moreover, not all of the configurations which will be described below are necessarily essential components of the present disclosure.

Figure 1:
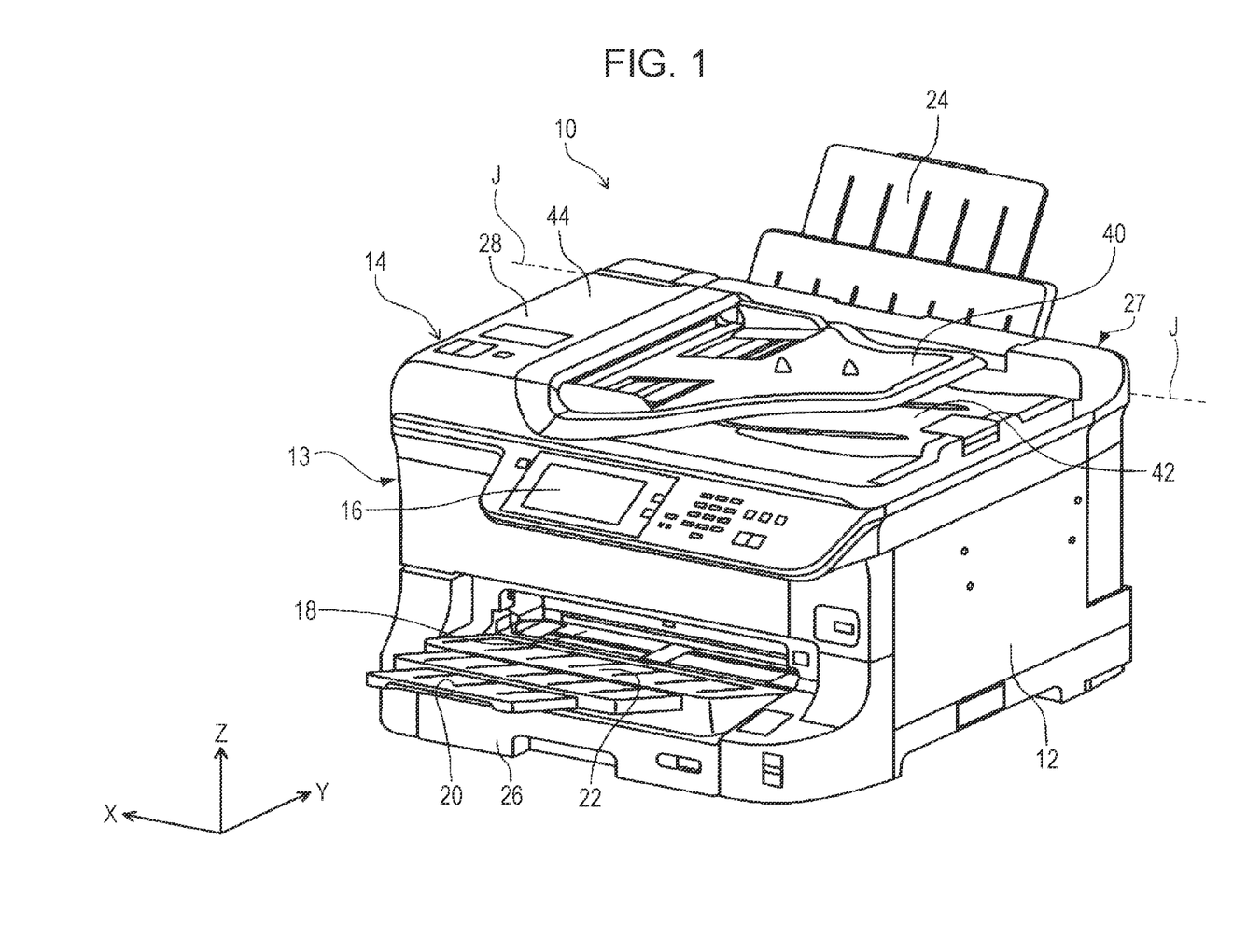
FIG. 1 is an external perspective view of a multifunction machine.

A multifunction machine 10 according to an embodiment will be described with reference to FIG. 1. FIG. 1 is an external perspective view of the multifunction machine 10 according to Embodiment 1.

The multifunction machine 10 includes an apparatus main body 12 having a substantially rectangular parallelepiped shape as a whole. The apparatus main body 12 includes a recording device 13 that performs recording on paper, which is an example of a medium to be recorded, and an image reading device 14 that is provided on the recording device 13 and capable of reading a document or the like. For example, an image read by the image reading device 14 is printed on a medium by the recording device 13. In the XYZ coordinate system, the X direction is the document transport direction in the image reading device 14, the Y direction is the document width direction, and the Z direction is the height direction of the image reading device 14.

The image reading device 14 includes an auto document feeder (ADF) section 27 which is an automatic document feeding device. The ADF section 27 is turnably provided with the rear surface side, which is the +Y-axis direction side, of the apparatus main body 12, as a fulcrum of a turning axis J, and is configured as an opening/closing body that can be opened and closed with respect to the upper portion of the apparatus main body 12.

The ADF section 27 includes a document transport section 28 having a drive mechanism for transporting documents, a document placement surface 40, and a document discharge surface 42. The document placed on the document placement surface 40 is fed into the image reading device 14 by the document transport section 28, read, and then discharged and placed on the document discharge surface 42. Note that an example of a document in the present embodiment is a photograph, a document, or the like.

An operation section 16 is provided at the upper portion of the front surface side of the apparatus main body 12 in the −Y-axis direction, and the operation section 16 includes a power button, a print setting button, a display panel, and the like for operating the multifunction machine 10.

A rear tray 24 on which paper is placed is provided on the rear surface side, which is the +Y-axis direction side, of the apparatus main body 12. The paper placed on the rear tray 24 is fed to a recording section 135 in the recording device 13 illustrated in FIG. 2 and recorded.

A paper accommodation section 26 for accommodating a plurality of paper sheets is provided on the bottom surface side, which is the −Z-axis direction side, of the front tray 22. The paper accommodation section 26 is slidably provided at the lower portion of the apparatus main body 12 in the Y-axis direction, and is detachably attached to the apparatus main body 12. The paper placed in the paper accommodation section 26 is fed to the recording section 135 in the recording device 13 and recorded.

On the front surface side of the apparatus main body 12, a drawer section 20 which is attached to a front tray 22 and is slidable in the Y-axis direction is provided. The paper fed from the rear tray 24 or the paper accommodation section 26 to the recording section 135 and recorded is discharged from an opening portion 18 provided on the front surface side of the apparatus main body 12, and is placed on the front tray 22 and the drawer section 20 in a state of being drawn out of the front tray 22.

The multifunction machine 10 of the present embodiment can feed the paper placed on the front tray 22 and the drawer section 20 into the recording device 13 through the opening portion 18 and perform recording by the recording section 135. Therefore, the front tray 22 and the drawer section 20 function as a support surface for paper discharged from the inside of the recording device 13 to the outside, and function as a support surface for paper fed into the recording device 13.

Figure 2:
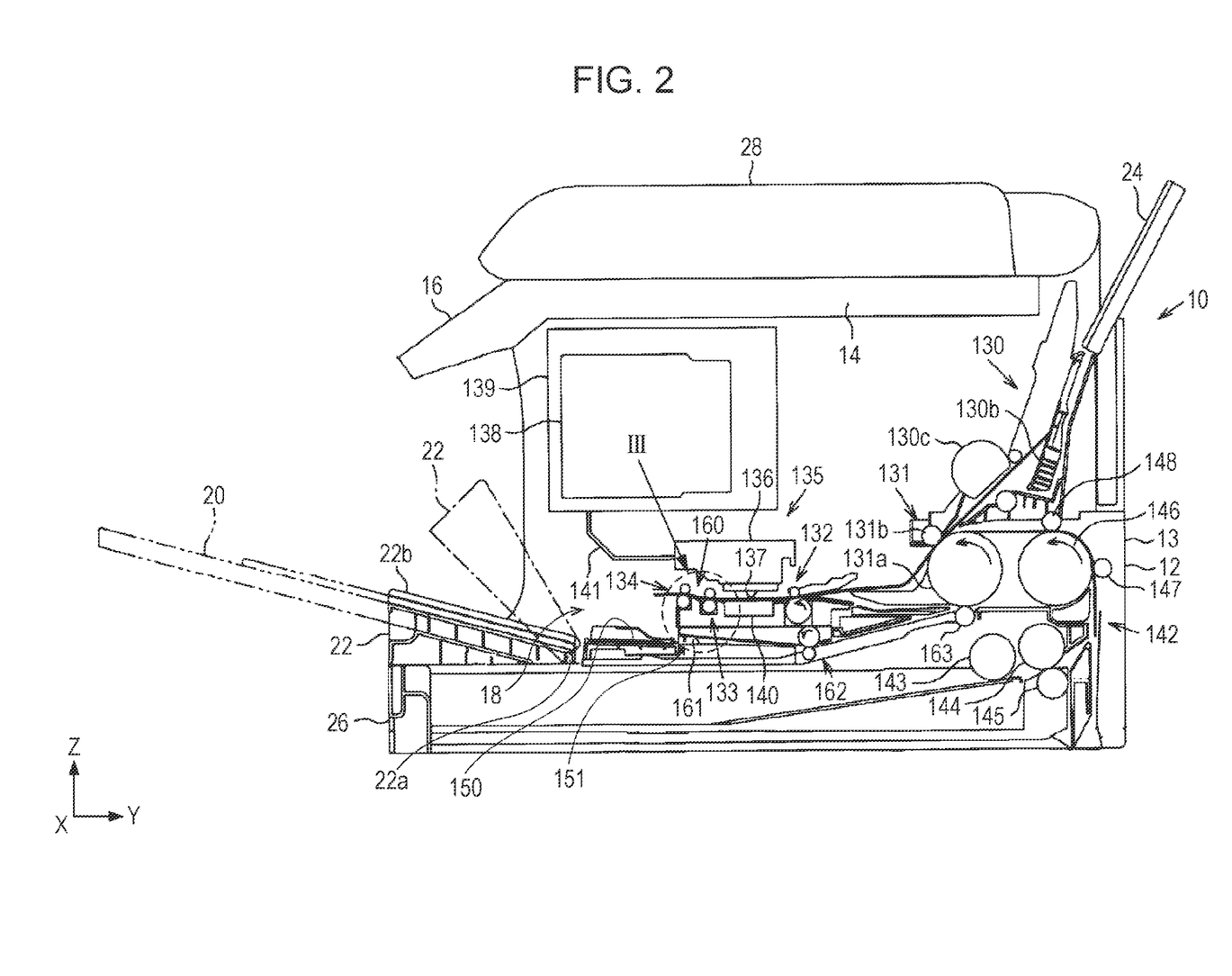
FIG. 2 is a side sectional view for describing a schematic configuration of a recording device.

Next, a schematic configuration of the recording device 13 will be described with reference to FIG. 2. FIG. 2 is a side sectional view for explaining a schematic configuration of the recording device 13 arranged on the bottom surface side of the image reading device 14 in the −Z-axis direction.

The front tray 22 has an upper surface 22b on which paper is placed, and is turnably provided with a shaft 22a extending in the X-axis direction as a fulcrum, as indicated by a dot dash line. As described above, the front tray 22 is provided with the drawer section 20 illustrated by the two-dot dash line that can be drawn out to the front surface side.

A feeding section 130 for feeding paper is provided at the upper rear portion of the recording device 13. The feeding section 130 includes a rear tray 24 on which paper is placed, a hopper 130b, and a feeding roller 130c. The paper placed on the rear tray 24 is pressed against the feeding roller 130c by the operation of the hopper 130b, and is sent out toward the downstream of the transport path by the rotation of the feeding roller 130c.

In the recording device 13, transport roller pairs 131 and 132 and discharge roller pairs 133 and 134 for transporting the paper from the feeding section 130 toward the front tray 22 are arranged along the transport path. The recording section 135 for performing recording on paper is arranged at a position between the transport roller pair 132 and the discharge roller pair 133.

The recording section 135 includes a carriage 136 that can reciprocate in the main scanning direction, which is the X-axis direction, and a recording head 137 provided below the carriage 136.

A cartridge holder 139 to which an ink cartridge 138 accommodating ink is detachably mounted is arranged above the recording section 135 in the recording device 13 in the +Z-axis direction. The recording section 135 also includes a support section 140 that supports the paper at a lower position facing the movement area of the recording head 137. The recording head 137 ejects the ink supplied from the ink cartridge 138 through the tube 141 onto the paper supported by the support section 140, thereby forming an image on the paper.

A discharge/transport path 160 is formed as a path along which the paper recorded by the recording head 137 is transported at the downstream in the transport direction, which is the −Y-axis direction of the paper, from the support section 140. The discharge/transport path 160 is a transport path for paper transported by the discharge roller pairs 133 and 134. A placement surface 150 that serves as an inner wall portion on the lower side of the opening portion 18 is provided at the downstream of the discharge/transport path 160 in the transport direction. The rear end side of the paper discharged from the discharge/transport path 160 is placed on the placement surface 150.

A supply section 142 that sends out the paper sheets accommodated in the paper accommodation section 26 one by one to the feeding path toward the recording section 135 is provided at the lower rear portion of the recording device 13 in the +Y-axis direction. The supply section 142 includes a pickup roller 143 that comes into contact with the uppermost sheet among the plurality of paper sheets in the paper accommodation section 26, a separation roller 144, and a retard roller 145 paired with the separation roller 144.

The supply section 142 includes an intermediate roller 146 arranged on the rear side of the transport roller pair 131 and two driven rollers 147 and 148 that sandwich the paper with the intermediate roller 146. The transport roller pair 131 includes an intermediate roller 131a rotationally driven in conjunction with the intermediate roller 146, and a driven roller 131b paired with the intermediate roller 131a.

When the pickup roller 143, the separation roller 144, and the intermediate rollers 146 and 131a are rotated counterclockwise in FIG. 2 by the power of the motor (not illustrated) provided in the apparatus main body 12, the paper sheets accommodated in the paper accommodation section 26 are fed one by one to the recording section 135 via the transport roller pairs 131 and 132.

A feed/transport path 161 along which the paper is fed to the rear surface side in the +Y-axis direction from the front surface side is formed on the bottom surface side of the discharge/transport path 160 in the −Z-axis direction. A transport roller pair 162 that transports the paper toward the intermediate roller 131a on the rear surface side is disposed in the feed/transport path 161, and a driven roller 163 that sandwiches the paper with the intermediate roller 131a is provided below the intermediate roller 131a.

The paper inserted into the feed/transport path 161 from the opening portion 18 is transported to the rear surface side by the transport roller pair 162, the intermediate roller 131a, and the driven roller 163, is reversed by the intermediate roller 146 and the driven rollers 147 and 148, is transported to the recording section 135 by the intermediate roller 131a, the driven roller 131b, and the transport roller pair 132, and is recorded.

Figure 3:
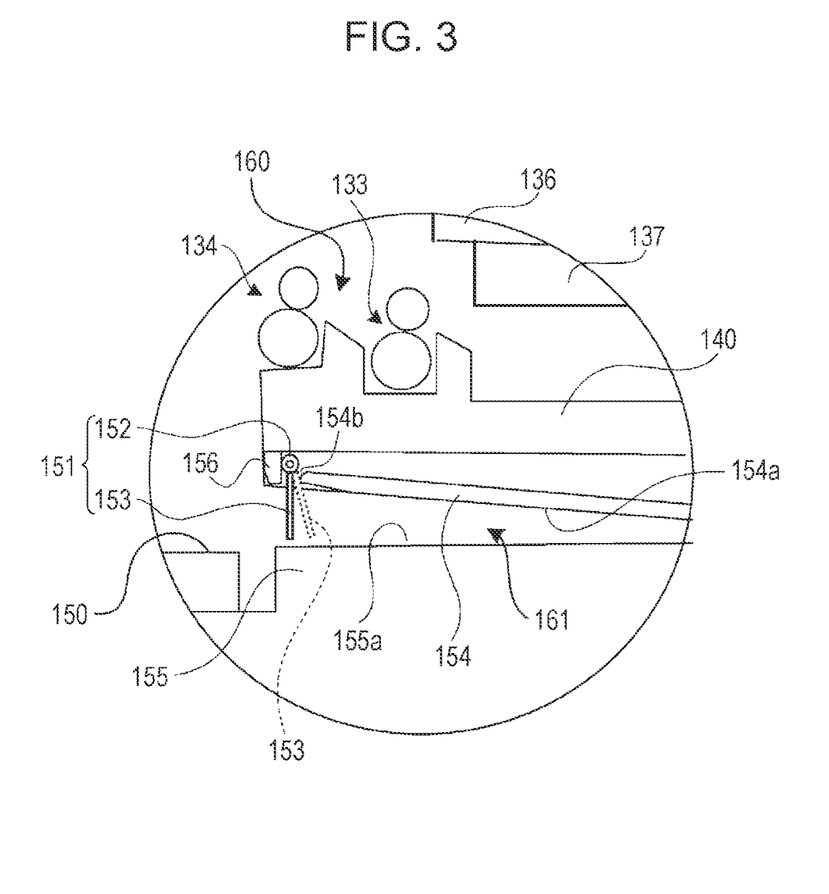
FIG. 3 is an enlarged view of a part provided with a restriction member in FIG. 2.

FIG. 3 is a view viewed from the X-axis direction, and is an enlarged view of a part (inside the circle indicated by the dashed line A) provided with the restriction member 151 in FIG. 2. The feed/transport path 161 is a transport path in which a guide surface 154a of an upper wall portion 154 and a guide surface 155a of a lower wall portion 155 face each other and are provided between the guide surface 154a and the guide surface 155a. The distance of the gap in the height direction between the guide surface 155a and the guide surface 154a is formed to become narrower toward the rear side.

The restriction member 151 has a swing shaft 152 and a swing member 153 that can swing with the swing shaft 152 as a fulcrum. The swing member 153 may be a plate-shaped member extending in the X-axis direction, or may be configured such that a plurality of rod-shaped members protruding downward from the swing shaft 152 are arranged side by side in the X-axis direction.

A front wall portion 156 protruding downward from the support section 140 is provided on the front side of the restriction member 151, and a front end portion 154b of the upper wall portion 154 is arranged on the rear surface side of the restriction member 151. Therefore, in the range in which the restriction member 151 swings with the swing shaft 152 as a fulcrum, as indicated by a solid line, the swing member 153 abuts against the front wall portion 156, and accordingly, the clockwise turning in the drawing is restricted. In addition, as indicated by a dashed line, the swing member 153 abuts against the front end portion 154b, and accordingly, the counterclockwise swinging in the drawing is restricted.

The height of the placement surface 150 is substantially the same as that of the guide surface 155a. When the user moves paper before recording along the placement surface 150 toward the feed/transport path 161, the tip end portion of the paper presses the swing member 153, and the swing member 153 is at the swing position indicated by a dashed line of FIG. 3, and the paper can enter toward the transport roller pair 162 from the gap between the swing member 153 and the guide surface 155a.

On the other hand, a plurality of paper sheets recorded by the recording section 135 and discharged from the discharge/transport path 160 may be placed in a stacked state on the placement surface 150. In such a case, by fixing the swing member 153 at the position indicated by the dashed line, it is possible to restrict a case where the end portions of the stacked paper on the restriction member 151 side collapse and enter the feed/transport path 161.

Figure 4:
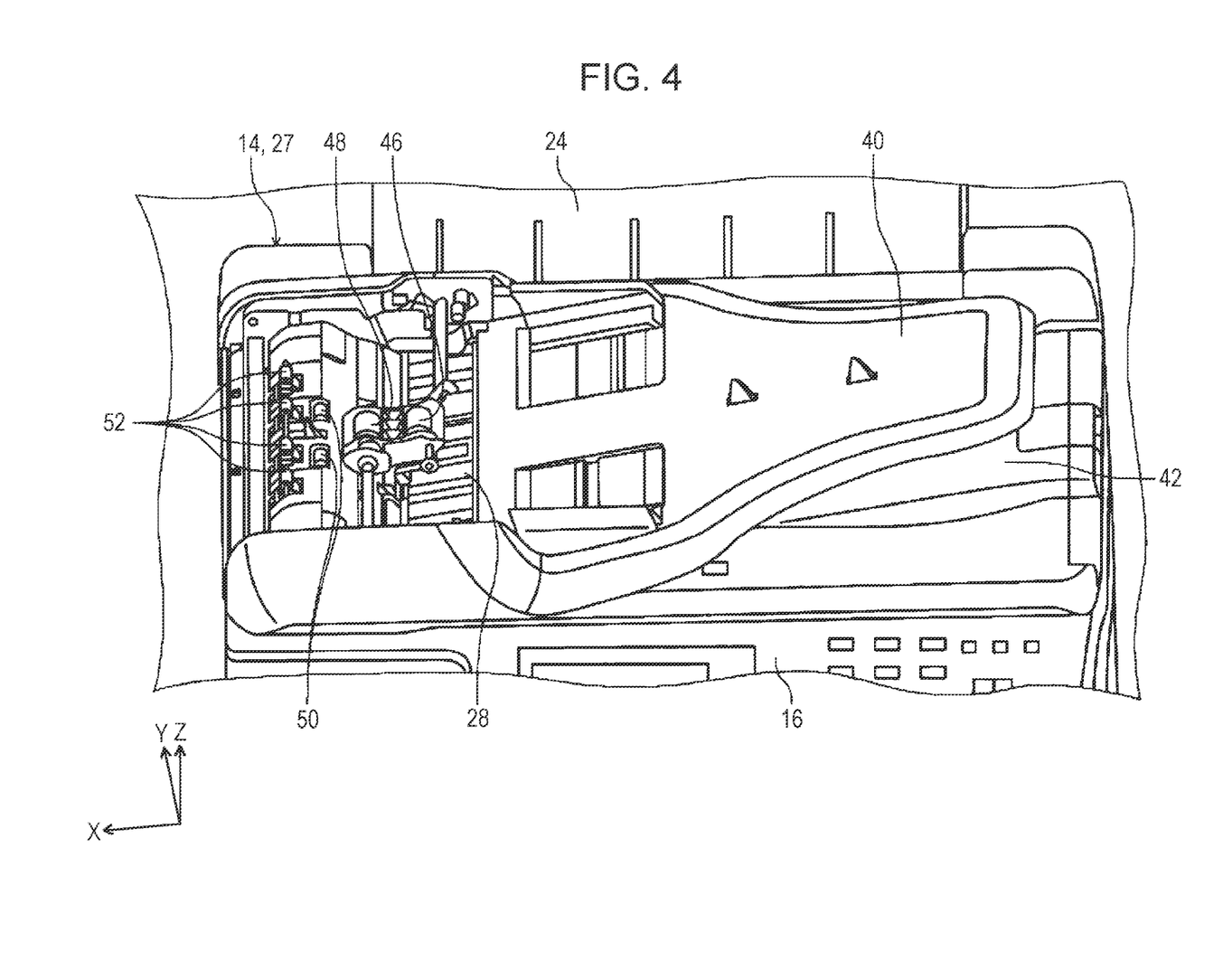
FIG. 4 is a perspective view illustrating an opening/closing body.

Next, the image reading device 14 will be described. FIG. 4 is a perspective view illustrating the ADF section 27 as an opening/closing body, FIG. 5 is a plan view illustrating the arrangement of the image reading surface 34 and the document platen 36, and FIG. 6 is a side sectional view of a drive mechanism section of the ADF section 27.

Figure 6:
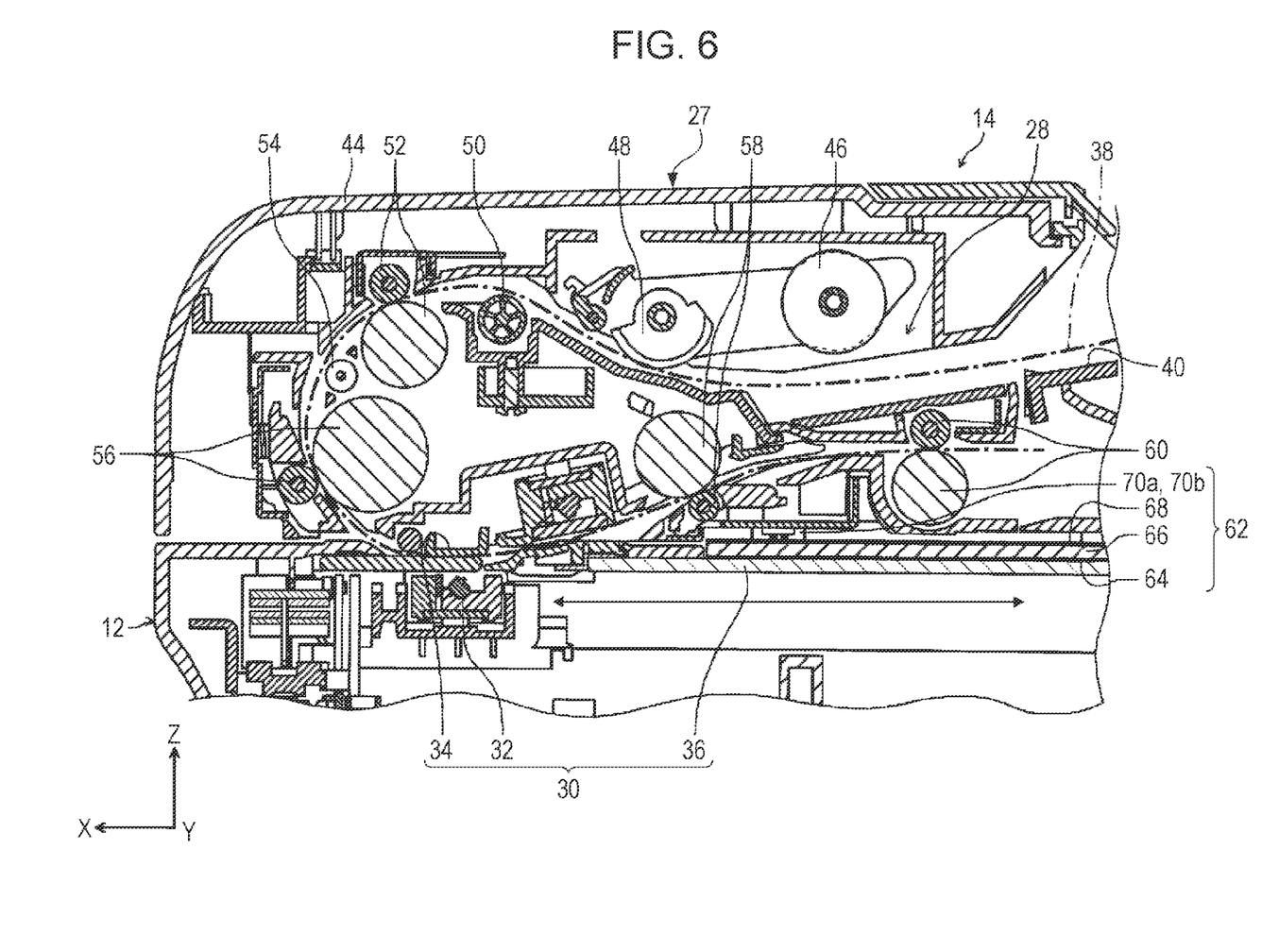
FIG. 6 is a side sectional view of a drive mechanism section for the opening/closing body.

The image reading section 30 in FIG. 6 includes an image reading sensor 32, an image reading surface 34, and a document platen 36. The image reading sensor 32 is configured to be movable in the X-axis direction by a drive mechanism (not illustrated). In addition, the image reading sensor 32 has an optical detector for reading an image extending in the Y-axis direction. Image reading and document size detection by the image reading sensor 32 will be described later.

Figure 5:
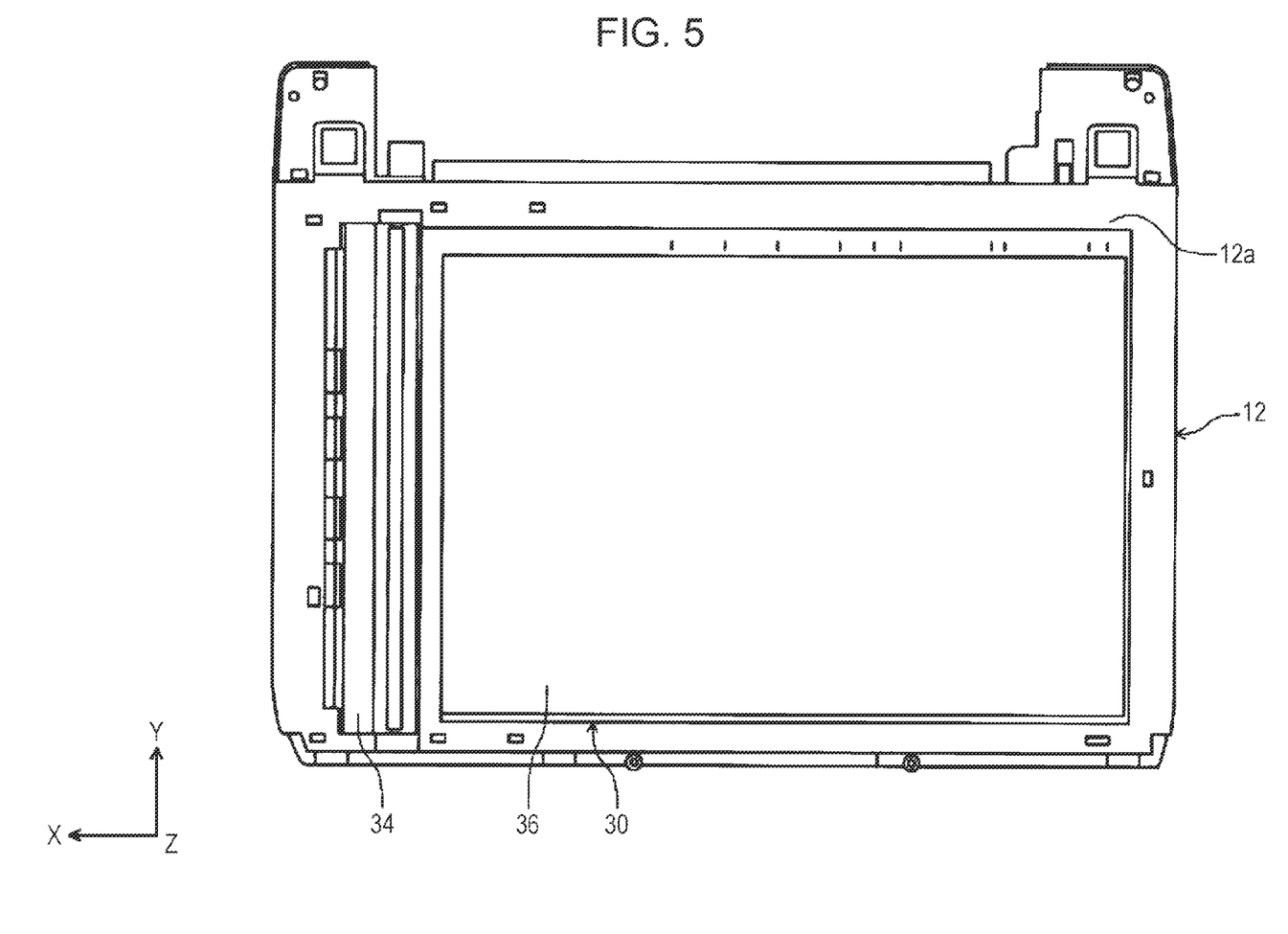
FIG. 5 is a plan view illustrating arrangement of an image reading surface and a document platen.

The image reading surface 34 and the document platen 36 are arranged in parallel on an upper portion 12a of the apparatus main body 12 in FIG. 5. The image reading surface 34 and the document platen 36 are made of a flat and transparent glass plate.

In the document platen 36, both end portions in the Y-axis direction and an end portion on the −X-axis direction side in the X-axis direction are supported by a frame (not illustrated) provided inside the apparatus main body 12.

The image reading surface 34 is provided to face a part of a document transport path 38 (will be described later) when the ADF section 27 is closed with respect to the upper portion of the apparatus main body 12 illustrated in FIG. 5. The length of the image reading surface 34 in the Y-axis direction is set in accordance with the direction intersecting the X-axis direction, in which the document transported on the document transport path 38 is transported, that is, the width direction of the document.

On the other hand, the length of the image reading surface 34 in the X-axis direction is set to be shorter than the length of the document in the transport direction and the document platen 36 because the image reading sensor 32 only needs to be able to read a part of the document which is in contact with the image reading surface 34 when a part of the document transported along the document transport path 38 is in contact with the image reading surface 34. The image reading sensor 32 can read the document through the image reading surface 34 when the document is in contact with the image reading surface 34.

The lengths of the document platen 36 in the X-axis direction and the Y-axis direction are set in accordance with the maximum size of the document that can be read by the apparatus main body 12. The document platen 36 of the multifunction machine 10 of the present embodiment can read standard size documents such as A3 and A4 sizes.

Specifically, in a state where the ADF section 27 is opened with respect to the apparatus main body 12, the document is placed on the document platen 36, and after the document is placed, the ADF section 27 is closed again with respect to the apparatus main body 12. After that, the document placed on the document platen 36 is read while the image reading sensor 32 is moved in the X-axis direction.

Figure 7:
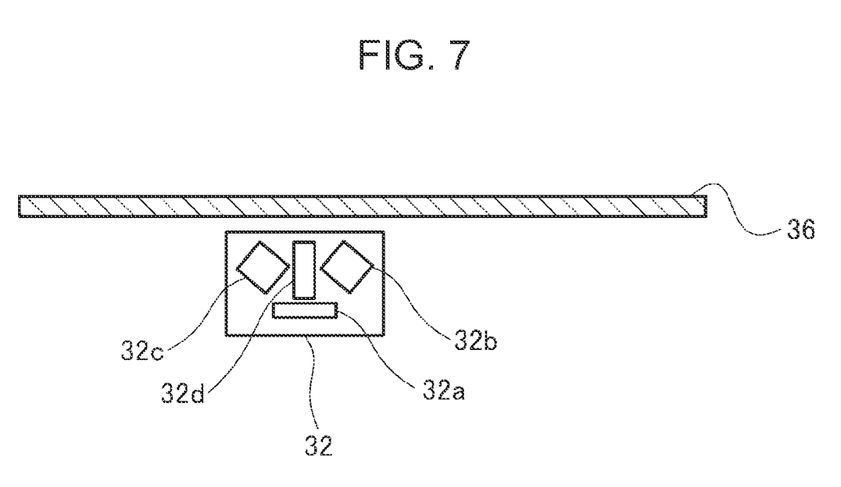
FIG. 7 is a side view of a reading sensor.

The reading of a document placed on the document platen 36 and the detection of the document size will be described with reference to FIG. 7. FIG. 7 is a side view of a document placed on the document platen 36.

The image reading sensor 32 includes a sensor 32a, light sources 32b and 32c, and a lens 32d.

The light sources 32b and 32c irradiate the document placed on the document platen 36 with light. The light emitted to the document and reflected is input to the image reading sensor 32 via the lens 32d, and the document is read. The image reading sensor 32 reads the entire document while moving in the X direction. When reading the document, either one of the light sources 32b and 32c may irradiate the document with light, and the light quantity emitted by the light sources 32b and 32c can be adjusted.

Further, a case where one of the light sources 32b and 32c is turned on to perform scanning is called single-side irradiation, and a case where both of the light sources 32b and 32c are turned on to perform scanning is called double-side irradiation.

Figure 8:
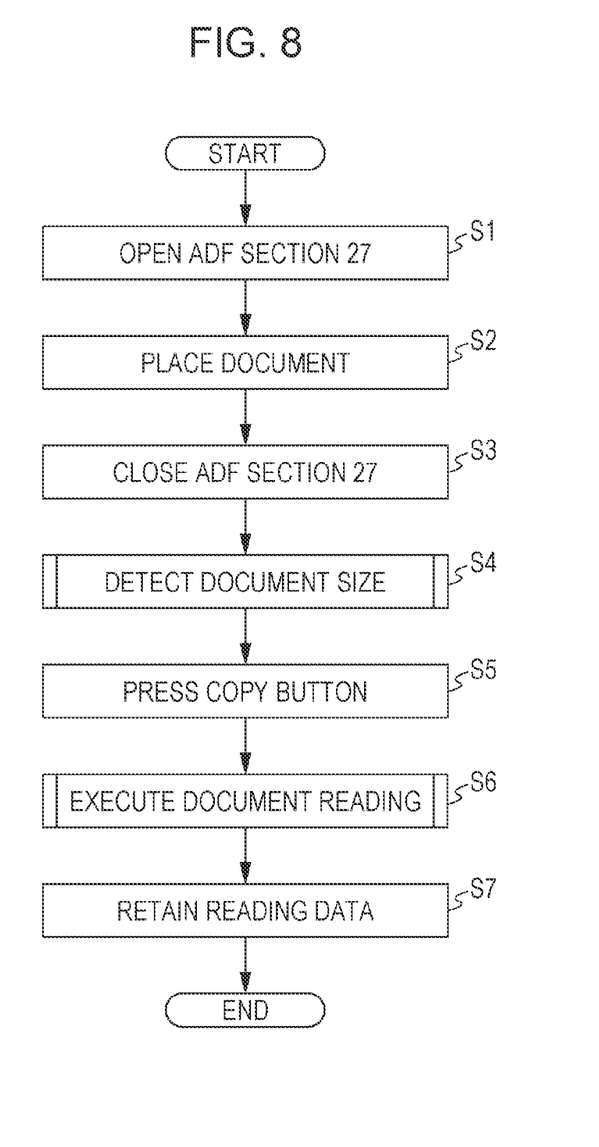
FIG. 8 is a flow chart illustrating document size detection and document reading.
Figure 9:
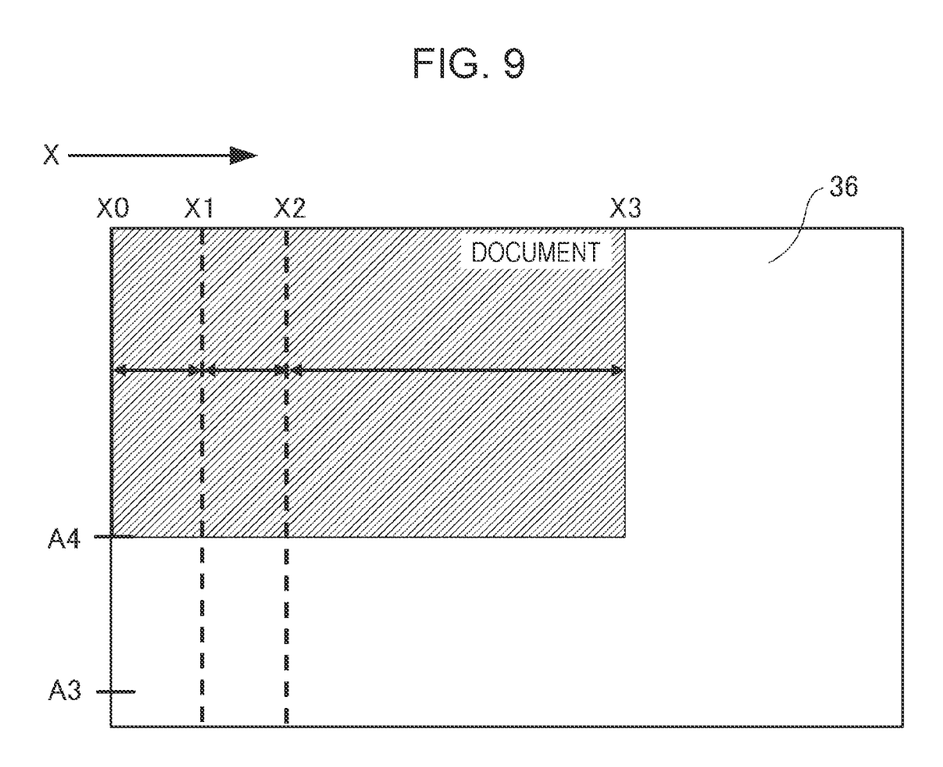
FIG. 9 is a diagram illustrating an example in which standard size A4 paper is placed on the document platen.

Document reading will be described with reference to FIGS. 8 and 9. FIG. 8 is a flow chart for document reading. FIG. 9 illustrates an example in which a standard size A4 document is placed on the document platen 36.

At S1, the user opens the ADF section 27. In other words, the user opens the ADF section 27 that functions as an opening/closing body in order to place the document to be scanned on the document platen 36.

At S2, the user places the document to be scanned on the document platen 36. For example, as illustrated in FIG. 9, the document is placed on the lower left part of the document platen 36. FIG. 9 illustrates an example in which a standard size A4 document is placed, but a document having another standard size may be placed. For example, the document placed on the document platen 36 may be A3, A5, or B4.

At S3, the user closes the ADF section 27. The document is placed at a predetermined position on the document platen 36 and the ADF section 27 is closed to complete the preparation for scanning.

In S3, when the user closes the ADF section 27, the document size detection in S4 is started. In S4, it is detected whether the document placed on the document platen 36 has a standard size A3 or A4. For example, as illustrated in FIG. 9, when the standard size A4 document is placed, the standard size A4 is detected in S4.

In S4, first, the image reading sensor 32 moves from a position X0 to a position X1. Here, the image reading sensor 32 scans from the position X1 to a position X2, detects the size of the document, and returns to position X0. For example, in the case of FIG. 9, the detected document size is A4.

While scanning between the position X1 and the position X2, the image reading sensor 32 turns on one of the light sources 32b and 32b to irradiate the document with light. For example, the image reading sensor 32 turns on the light source 32b. Here, scanning from the position X1 to the position X2 is an example of the first scanning. For example, it is preferable that the distance from the position X0 to the position X1 is approximately 20 mm, and the distance from the position X1 to the position X2 is approximately 10 mm.

In this manner, in detecting the size of the document in S6, the size of the document is detected by reading the area between the position X1 and the position X2 instead of the entire document, and thus the size of the document can be detected in a short period of time. In addition, since the image reading sensor 32 performs single-side irradiation in which any one of the light sources 32b and 32c is turned on, the power consumption of the image reading sensor 32 can be suppressed.

For example, in a case where the document is relatively thick, such as photo paper, when the document is irradiated with light, shadows are likely to appear on the edge of the document because the document is thick, and the size of the document can be accurately detected even with single-side irradiation.

In addition, in the case of a relatively thin document such as tracing paper, when the document is irradiated with light, shadows are unlikely to appear on the edge of the document because the document is thin, and it is often difficult to recognize the document size. When scanning such a relatively thin document with double-side irradiation in which both the light sources 32b and 32c of the image reading sensor 32 are turned on, the light is emitted also from the direction of canceling the shadows formed by the irregularities on the surface of the document, and thus, it may be difficult to read the shadows of the irregularities on the surface of the document. In addition, since the document is relatively thin, shadows are less likely to appear on the edge of the document, making it difficult to detect the size of the document.

On the other hand, by employing a configuration in which the single-side irradiation for turning on only one of the light sources 32b and 32c of the image reading sensor 32, the light quantity emitted to the document can be reduced, the irradiation can be made from one direction, and thus the shadows of the irregularities on the surface of the document can be emphasized. Therefore, the size of the document can be detected more accurately based on the recognized irregularities of the surface of the document.

In S5, the user operates the operation section 16 to cause the multifunction machine 10 to read the document. Buttons for executing scanning, executing copying, and the like are displayed on the operation section 16, and when the user presses these buttons, scanning of the document is executed.

In S6, reading of the document is executed. The document is read according to the document size detected in S4. For example, as described above, when the document size is detected to be A4 in S4, the image reading sensor 32 performs the second scanning for scanning the area between the position X0 to a position X3 while moving from the position X0 to the position X3 to cover the area of the A4 size document in the X-axis direction. As a result, the amount of movement of the image reading sensor 32 can be minimized, and the document can be read in a short period of time.

In addition, in the second scanning, the image reading sensor 32 employs a configuration in which scanning is executed by double-side irradiation in which both the light sources 32b and 32c are turned on, and thus the document can be accurately read with a sufficient light quantity.

The document read in S6 may be discharged from the discharge/transport path 160 as described above, or may be stored as image data in a storage device (not illustrated). The image data may be transmitted to a computer network-coupled to the multifunction machine 10, or the user may couple a storage medium to the multifunction machine 10 and retrieve the image data from the multifunction machine 10.

Figure 10:
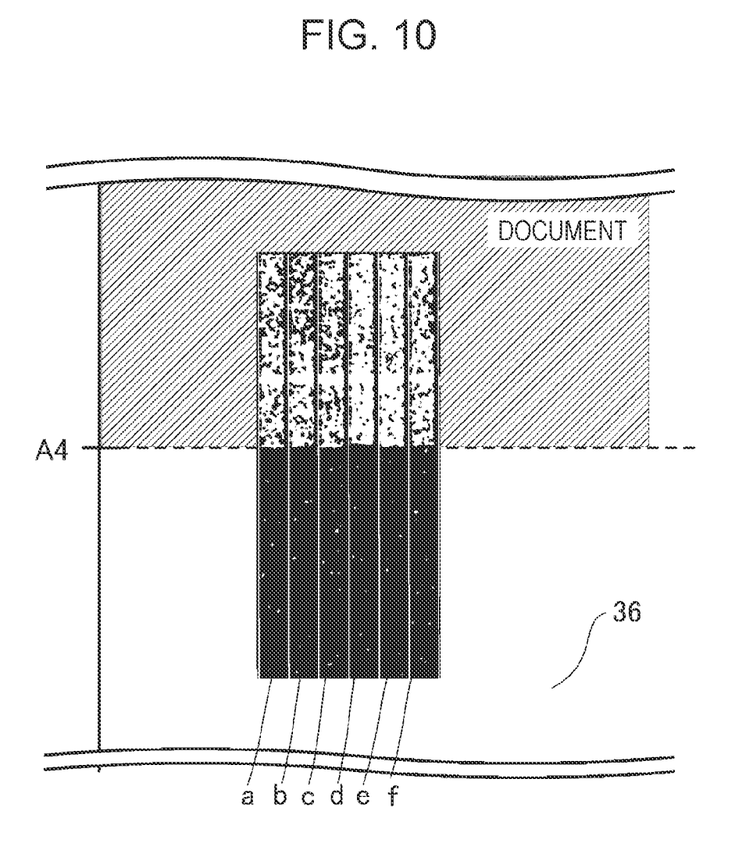
FIG. 10 is a diagram illustrating an example of a document size detection result by single-side irradiation.
Figure 11:
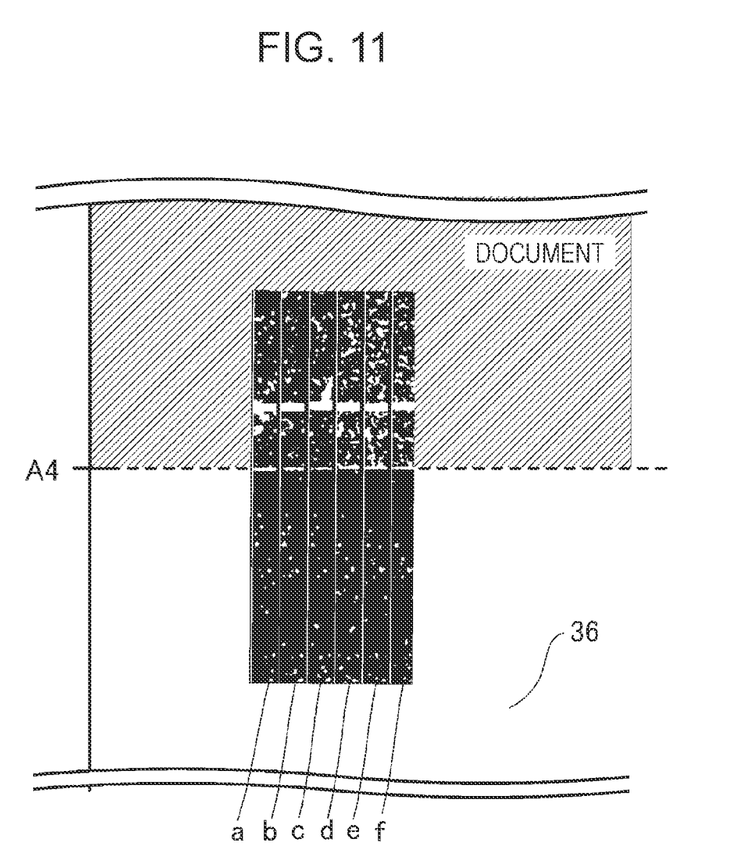
FIG. 11 is a diagram illustrating an example of a document size detection result by double-side irradiation.

FIGS. 10 and 11 show an example of the result of reading the standard size A4 document. FIG. 10 is a diagram illustrating an example of a document size detection result by single-side irradiation. Further, FIG. 11 is a diagram illustrating an example of the document size detection result by double-side irradiation.

In FIG. 10, for document paper sheets a to f, the detection results show that the document part is white and the outer side of the document is black, and the standard size document can be detected in single-side irradiation. Here, the document paper sheets a to f are thin paper sheets such as tracing paper, and the sizes of paper sheets of standard size document are detected.

On the other hand, in FIG. 11, for the document paper sheets a to f, the detection results show that the document part and the outer side of the document have almost the same black, and the accuracy of detecting a standard size document with double-side irradiation is lower than that with single-side irradiation.

For thin document paper sheets such as tracing paper, it is possible to improve the accuracy of detecting textures such as irregularities or roughness of the surface of the document paper sheet when detecting the paper not by double-side irradiation but by single-side irradiation with a small light quantity.

Above, the present embodiment was described, but the present disclosure is not limited to the present embodiment, and can be implemented in various modes without departing from the gist thereof.

The present disclosure includes substantially the same configurations (for example, configurations having the same functions, methods, and results, or configurations having the same objects and effects) as the configurations described in the embodiments. Further, the present disclosure includes configurations in which non-essential parts of the configuration described in the embodiments are replaced. In addition, the present disclosure includes configurations that achieve the same operational effects or configurations that can achieve the same objects as those of the configurations described in the embodiment. Further, the present disclosure includes configurations in which a known technology is added to the configurations described in the embodiments.

The following contents are derived from the above-described embodiments.

According to an aspect, there is provided an image reading device including: a document platen on which a document is placed; and a reading sensor having a light source for irradiating the document with light, in which the reading sensor performs first scanning for irradiating the document with light at a first light quantity, and then performs second scanning for irradiating the document with light at a second light quantity greater than the first light quantity.

According to this image reading device, by performing the first scanning and the second scanning with different light quantities, it is possible to perform a plurality of types of scanning for different purposes on one document.

In the image reading device according to the aspect, the light source may include a first light source and a second light source, and in the reading sensor, the first light source may irradiate the document with light having the first light quantity in the first scanning, and the first light source and the second light source may irradiate the document with light having the second light quantity in the second scanning.

According to this image reading device, since the light source includes the first light source and the second light source, it is possible to irradiate the document with light having different light quantities in the first scanning and the second scanning. For example, it is possible to irradiate the document with a first light quantity in the first scanning, and irradiate the document with a second light quantity greater than the first light quantity in the second scanning. Since the reading sensor can irradiate the document with different light quantities for the first scanning and the second scanning, the first scanning and the second scanning can be selectively used according to the purpose of scanning.

In the image reading device according to the aspect, power consumption of the reading sensor in the second scanning may be greater than power consumption in the first scanning.

In the image reading device according to the aspect, the reading sensor may determine a state of the document in the first scanning, and may output the scanned document as image data in the second scanning.

According to this image reading device, it is possible to determine the size of the document and the texture of the document in the first scanning, and then perform the second scanning corresponding to the result of the first scanning. In addition, since the document read by the reading sensor can be output as data, paper can be saved. Further, it becomes possible for a network device coupled to the image reading device to receive the data.

What is claimed is:

1. An image reading device comprising:
  a document platen on which a document is placed; and
  a reading sensor having a light source for irradiating the document with light, wherein
  the reading sensor performs first scanning for irradiating the document with light at a first light quantity, and then performs second scanning for irradiating the document with light at a second light quantity greater than the first light quantity subsequent to performing the first scanning.

2. The image reading device according to claim 1, wherein
  the light source includes a first light source and a second light source, and
  in the reading sensor, the first light source irradiates the document with light having the first light quantity in the first scanning, and the first light source and the second light source irradiate the document with light having the second light quantity in the second scanning.

3. The image reading device according to claim 1, wherein
  power consumption of the reading sensor in the second scanning is greater than power consumption in the first scanning.

4. The image reading device according to claim 1, wherein
  the reading sensor determines a state of the document in the first scanning, and outputs the scanned document as image data in the second scanning.

5. The image reading device according to claim 4, wherein
  the reading sensor determines a size of the document in the first scanning as the state of the document.

* * * * *